United States Patent [19]

Vierling

[11] 4,433,673
[45] Feb. 28, 1984

[54] METHOD AND APPARATUS FOR CONTINUOUSLY SUPPLYING A LOAD

[76] Inventor: Donald E. Vierling, 11309 Toledo Dr., Austin, Tex. 78759

[21] Appl. No.: 411,549

[22] Filed: Aug. 25, 1982

Related U.S. Application Data

[63] Continuation-in-part of Ser. No. 81,876, Oct. 4, 1979.

[51] Int. Cl.³ .............................................. F24J 3/02
[52] U.S. Cl. .................................. 126/435; 60/641.8; 126/436; 126/452
[58] Field of Search ............... 126/421, 435, 430, 436, 126/437, 452, 900, 400; 60/641.8

[56] References Cited

U.S. PATENT DOCUMENTS

| 4,054,124 | 10/1977 | Knoos | 126/435 |
|---|---|---|---|
| 4,063,419 | 12/1977 | Garrett | 60/641 |
| 4,146,057 | 3/1979 | Friedman | 60/641 |
| 4,222,365 | 9/1980 | Thomson | 126/436 |
| 4,263,961 | 4/1981 | Morawetz | 126/436 |
| 4,265,223 | 5/1981 | Miserlis | 60/641 |
| 4,280,328 | 7/1981 | Falconer | 126/435 |
| 4,280,553 | 7/1981 | Bean | 126/435 |
| 4,291,756 | 9/1981 | Bracht | 126/436 |
| 4,335,706 | 6/1982 | Passarelli | 126/437 |
| 4,358,929 | 11/1982 | Molivadas | 60/641.8 |
| 4,387,574 | 6/1983 | Becker | 126/435 |
| 4,403,601 | 9/1983 | Hunt | 126/435 |

*Primary Examiner*—Daniel J. O'Connor
*Attorney, Agent, or Firm*—Martin J. Carroll

[57] ABSTRACT

Solar energy is collected in any suitable manner with part of the energy being used immediately to produce mechanical or electrical energy. Another part of the solar energy is used to heat a liquid metal which is stored until the sun is not out. At that time the heat from the liquid metal vaporizes another liquid which is then used to produce mechanical or electrical energy. A further part of the solar energy is used to produce hydrogen which is stored until the mechanical or electrical energy produced by the first two parts of the solar energy during a twenty-four hour period is not sufficient to produce the required energy for the twenty-four hour period. At that time the hydrogen is used to produce the remainder of the required mechanical or electrical energy.

6 Claims, 1 Drawing Figure

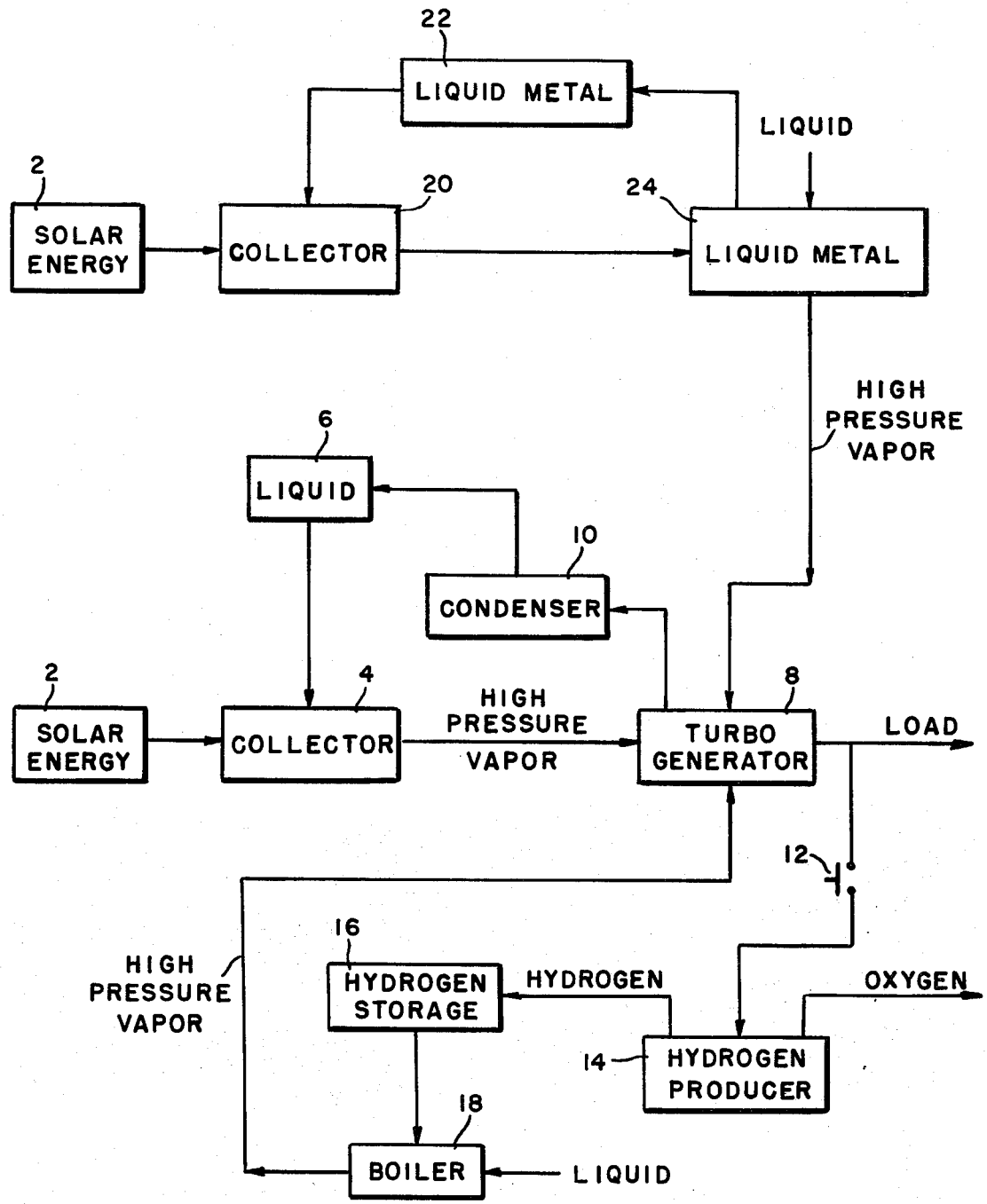

METHOD AND APPARATUS FOR CONTINUOUSLY SUPPLYING A LOAD

This application which is a continuation-in-part of my co-pending application, Ser. No. 81,876, filed Oct. 4, 1979 relates to a method and apparatus for utilizing solar energy and more particularly to continuously supplying a load.

Solar energy is readily available, but has the disadvantage that it is not available at all times. Thus, it must be used to supplement other forms of energy or a portion of it must be stored for later use. This latter poses many problems which vary due to climatic conditions. In some areas the sun shines a substantial percentage of the daylight hours most days of the year. Obviously this is the best condition for using solar energy, but even here the suggested solutions are expensive and do not normally provide for storing energy for use during times of little or no sunshine. In those geographical areas where there is relatively little sunshine many days the problems are much greater.

The use of a boiler as shown in Bell U.S. Pat. No. 4,002,031 dated Jan. 11, 1977 may be used to store some energy when the sun is not out for a short period of time, but obviously could not be used for taking care of a continuous load overnight even though the continuous load is generally less at night. This is also true of members 21 and 23 of Sawata U.S. Pat No. 4,010,732 dated Mar. 8, 1977. Arthur U.S. Pat. No. 4,010,614 dated Mar. 8, 1977 uses solar energy to produce steam to drive a generator and a pump which raises water to an elevated reservoir. While this could be used to satisfy a continuous load it has many disadvantages. It is very expensive and inefficient. It requires a great deal of water which is not readily available especially in dry climates where solar energy is very available. Derby et al U.S. Pat. No. 4,079,591 dated Mar. 21, 1978 discloses a system in which a small amount of solar produced energy is stored as compressed air. While this could be used for very light loads it would be too expensive for large loads and could not be used to provide energy on days of little or no sunshine.

According to my invention I utilize two storage systems for solar produced energy. The first system has sufficient capacity to satisfy the load when the sun is not out during a normal twenty-four hour day. The second system has sufficient capacity to satisfy the load on abnormal days of less or no sunshine.

It is therefore an object of my invention to provide an efficient method of continuously supplying a load utilizing solar energy.

Another object is to provide inexpensive apparatus suitable for carrying out my method.

These and other objects will be more apparent after referring to the following specification and attached drawing in which the single FIGURE is a schematic view of the apparatus of my invention.

Referring more particularly to the drawing, reference numeral 2 indicates the sun or the solar energy source. This energy is collected in a standard collector 4 such as a Heliostat or flat plate collector which heats a liquid, preferably water, from storage tank 6 to an elevated temperature. This heated water in the form of high pressure steam is fed to a turbo-generator 8 so as to produce electrical energy. The spent steam leaving the turbo-generator passes to a condensor 10 and then to the tank 6. Part of the produced electrical energy is used immediately to take care of the load on the system. The remainder of the electrical energy is fed through switch 12 to a hydrogen producer 14 where it is used to dissociate water into oxygen and hydrogen with the hydrogen passing into storage tank 16 where it is stored as a gas or liquid, but preferably as a metallic hydride. When necessary the hydrogen is fed to a boiler 18 where it is used to produce high pressure steam to operate the turbo-generator 8.

Additional solar energy is collected in a second collector 20 to which a low boiling liquid metal is fed from storage tank 22. The liquid metal is heated to a high temperature, preferably 350° C. or higher, and fed to storage tank 24. The term "metal" as used herein includes alloys as well as pure metals. It is much perferred to use mercury. Other suitable metals are cesium and gallium which are liquid at room temperatures. Rubinium and potassium may be used but are not preferred because of the possible danger involved. When the sun goes down the energy stored in tank 24 as liquid metal is used to vaporize water or other liquid to a high pressure then returned to tank 22. The steam is fed to the turbo-generator 8.

In operation, the system is designed in accordance with the climatic conditions. The amount of energy collected by collector 20 is sufficient to satisfy the load requirements when the sun is not normally shining. Thus during a normal day the system works without utilizing any hydrogen. The same is true on an abnormally sunny day. The energy collected by collector 20 must be sufficient to produce enough electrical energy to satisfy the load requirements during sun shining hours plus enough energy to produce sufficient hydrogen to satisfy load demands due to abnormal weather conditions such as very cloudy days.

During a standard day both collectors 4 and 20 will be in operation while the sun is shining with energy from collector 4 operating turbo-generator 8 to supply energy to satisfy the load and also to generate hydrogen which is stored in tank 16. Of course when the tank 16 is filled to capacity this can be discontinued. When there is no sun the heat stored in the liquid metal is used to run turbo-generator 8 to supply the load requirements.

During a day having less than the standard amount of sun the operation is as for a standard day in so far as possible. However, when no more energy is available from these two sources, the stored hydrogen will be used to operate boiler 18 to satisfy load requirements. For best efficiency it is preferred to use a single turbo-generator as shown and to use high pressure steam to operate it. It is preferred that the steam pressure be at least 1000 pounds per square inch at a temperature of at least 290° C., but pressures of 1800 to 3500 pounds per square inch at a temperature of 538° C. are very suitable.

For the purpose of simplicity only the essential features necessary for one skilled in the art have been shown. It will be evident that pumps and valves will be used to control flow as desired and that for best efficiency all conduits and tanks will be well insulated.

While several embodiments of my invention have been shown and described it will be understood that other adaptations and modifications may be made within the scope of the following claims.

I claim:

1. The method of continuously supplying a load by means of solar energy which comprises collecting solar energy and immediately producing useable energy therefrom to supply said load, at the same time collecting a further amount of solar energy to heat a molten metal to a high temperature, storing said heated metal until solar energy is not available, the amount of said stored energy being sufficient to supply said load for at least the majority of time solar energy is not available during a normal day, collecting a further amount of solar energy to produce hydrogen, and utilizing said hydrogen to supply said load when the first two energy supplies are exhausted.

2. The method of claim 1 in which the molten metal is liquid at ambient temperatures.

3. The method of claim 2 in which the molten metal is mercury.

4. Apparatus for continuously supplying a load by means of solar energy which comprises means for collecting solar energy, means for immediately producing useable energy from a portion of said collected energy to supply said load, a liquid metal storage means, means for feeding a second portion of said collected energy to said liquid metal storage means, means utilizing the energy in said stored liquid metal to supply said load when solar energy is not available, a hydrogen generator, means feeding a third portion of said collected energy to said hydrogen generator, hydrogen storage means connected to said hydrogen generator, and means utilizing said hydrogen to supply said load when the first two energy supplies are exhausted.

5. Apparatus for continuously supplying a load by means of solar energy which comprises means for collecting solar energy, a turbo-generator, liquid storage means connected to said solar energy collecting means with said liquid being changed to a high pressure vapor by said solar energy, means for feeding said high pressure vapor to said turbo-generator to produce electricity, means connecting at least a portion of said produced electricity to said load, an hydrogen producer, hydrogen storage means, means feeding a portion of said produced electricity to said hydrogen producer to produce hydrogen, means feeding said produced hydrogen to said hydrogen storage means, liquid metal storage means connected to said solar collecting means and being heated by a portion of said collected solar energy, heated liquid metal storage means for receiving heated liquid metal from said solar energy collecting means, means for feeding a liquid to said heated liquid metal storage means whereby said liquid is changed to a high pressure vapor, and means for feeding said last named high pressure vapor to said turbo-generator when solar energy is not available.

6. Apparatus according to claim 5 including a boiler, means feeding hydrogen from said hydrogen storage means to said boiler to supply heat thereto and thereby produce a high pressure vapor, and means for feeding said last named high pressure vapor to said turbo-generator when the first two named high pressure vapors are not available.

* * * * *